United States Patent
Chien et al.

(10) Patent No.: US 8,450,959 B2
(45) Date of Patent: May 28, 2013

(54) CONTROL METHOD FOR SENSORLESS MOTORS WITH ENERGY RECOVERY ABILITY

(75) Inventors: Shih-Hsiang Chien, Yilan County (TW); Shih-Hsin Hsu, Taipei County (TW); Yee-Pien Yang, Taipei (TW); Tian-Hua Liu, New Taipei (TW); Jui-Ling Chen, Changhua County (TW)

(73) Assignee: Industrial Technology Research Institute, Hsin-chu (TW)

( * ) Notice: Subject to any disclaimer, the term of this patent is extended or adjusted under 35 U.S.C. 154(b) by 203 days.

(21) Appl. No.: 13/167,875

(22) Filed: Jun. 24, 2011

(65) Prior Publication Data

US 2012/0256575 A1 Oct. 11, 2012

(30) Foreign Application Priority Data

Apr. 8, 2011 (TW) .............................. 100112197 A (51) Int. Cl.
*H02P 6/00* (2006.01)

(52) U.S. Cl.
USPC ............. 318/400.35; 318/400.17; 318/400.36

(58) Field of Classification Search
USPC .................. 318/400.35, 400.17, 400.36, 439, 318/720, 724, 434, 139, 632, 811
See application file for complete search history.

(56) References Cited

U.S. PATENT DOCUMENTS

| 7,640,128 B2 | 12/2009 | Moriarty et al. |
| 7,702,432 B2 | 4/2010 | Bandai et al. |
| 2004/0263104 A1* | 12/2004 | Iwanaga et al. ............... 318/439 |

FOREIGN PATENT DOCUMENTS

| TW | 546931 B | 8/2003 |
| TW | I257761 B | 7/2006 |
| TW | I274468 B | 2/2007 |
| TW | M318077 U | 9/2007 |

OTHER PUBLICATIONS

Reiko Raute et al., "Sensorless permanent magnet ac motor Drive with Near Zero-Speed Operation for Electric-Assisted Bicycle", Raute.R./ Power Electronics and Applications, European Conference /20050501, pp. 1-10.
Yen-Shin Lai et al,,"Novel Back—EMF Detection Technique of Brushless DC Motor Drives for Wide Range Control Without Using Current and Position Sensors", IEEE Transactions on Power Electronics, vol. 23, No. 2, pp. 934-940, Mar. 2008.
Ming-Ji Yang et al, "A Cost-Effective Method of Electric Brake With Energy Regeneration for Electric Vehicles", IEEE Transactions on Industrial Electronics, vol. 56, No. 6, pp. 2203-2212, Jun. 2009.

* cited by examiner

*Primary Examiner* — Karen Masih
(74) *Attorney, Agent, or Firm* — Rabin & Berdo, P.C.

(57) ABSTRACT

The present disclosure related to a control method for a sensorless motor with energy recovery ability, using which duty cycle of a sensorless motor can be changed by the control of complementary switches so as to enable the sensorless motor to switch between a high efficiency driving operation and an energy recovery operation while being activated. Thereby, the conduction loss and the wear and tear to the switches can be minimized while simultaneously enhancing the energy recovery efficiency and thus improving the battery life.

5 Claims, 7 Drawing Sheets

CONTROL METHOD FOR SENSORLESS MOTORS WITH ENERGY RECOVERY ABILITY

TECHNICAL FIELD

The present disclosure related to a control method for a sensorless motor with energy recovery ability, and more particularly, to an electric motor for traffic vehicles and the operation thereof can be switched between the normal operating mode and the energy-recovery mode automatically. The disclosure can be applied to the industries of electric bicycle, electric motorcycle, electric automobile, or other electric automation, so as to increase the added value of traffic vehicles.

TECHNICAL BACKGROUND

Conventionally, to detect the operation of a three-phase brushless motor, a detector may be disposed on the magnetic pole of its rotor or on the rotor shaft. The detector has to be attached precisely on the rotor shaft to let the motor operate normally. Also, a space in the motor needs to reserved to mount the detector and its electric cords. The volume size and the operation cost of the foregoing motor may be increased, and the additional electric devices may dissipate more power. Recently a sensorless motor control method has been proposed, which needs a corresponding driving circuit to detect position of the magnetic pole in the motor indirectly and to operate the motor. However, the sensorless control method is used in the prior art to drive motors, without including the function of energy recovery to recycle possible electric energies. Even though the regenerative braking method has been proposed to recycle energy in motors, the energy-recovery efficiency therein is still not satisfied.

Therefore, it is in need of an apparatus and method for driving a sensorless motor of energy recovery ability, which can perform the energy-recovery operation automatically with an improved efficiency. And thereby, the volume size of the motor can be diminished with improved operable power.

TECHNICAL SUMMARY

To overcome the drawbacks in the prior art, the present disclosure provides a method for controlling a sensorless motor of energy recovery ability. The motor can be mounted on a traffic vehicle and its operation can be switched between the normal operating mode and the energy-recovery mode automatically. The disclosure can be applied to a variety of industry fields, such as electric bicycle, electric motorcycle, electric automobile, and other electric automation, so as to increase the added value of traffic vehicles.

Another object of the present disclosure is to improve the technique of the prior-art sensorless motor, which focused on detecting the rotor position for starting and controlling the motor. Since the function of energy recovery has been an essential issue in the development of electric vehicle, the regenerative braking method was used to recycle energy, but the flywheel diodes in the regenerative braking controller may cause the switching loss and the heating issue in the diodes. The power dissipation in the flywheel diodes may be inevitable either in the motor operating mode or in the energy-recovery mode. In the present disclosure, it is presented that a control method of automatically switching between the motor operating mode and the energy-recovery mode may. The current flow paths are built by the turning-on switches instead of by the flywheel diodes, so that the power dissipation can be lowered and the energy-recovery efficiency can be improved remarkably.

Therefore, according to one aspect of the present disclosure, one embodiment provides a method for controlling a sensorless motor of energy recovery ability, which comprising the steps of: selecting a comparing voltage from a first or a second voltage by setting a duty cycle of a duty-cycle setting unit; comparing a terminal voltage of the motor in the non-excited phase with the comparing voltage, so as to determine the occurrence of a zero-crossing of the back EMF in the motor; shifting a phase angle required to start the motor after the occurrence of the zero-crossing, so as to perform phase commutation in the motor; transmitting a trigger signal to set the operation of the motor in a normal operating mode or in an energy-recovery mode, according to the commutation period, a triangular wave provided by a triangular waveform generator, and the duty cycle of the duty-cycle setting unit; producing the comparing voltage and detecting the terminal voltage of the motor in the non-excited phase, so as to measure the back EMF in the motor, at the time either when a time counter of the triangular waveform generator is reset to zero or when the counting period ends; setting the first voltage as the comparing voltage if the turn-on duration of a lower-arm switch in the control phase of chopped wave which is used to control turning-on or off between two phases is larger than the duty cycle; otherwise, setting the second voltage as the comparing voltage; comparing the back EMF to the comparing voltage, if no zero-crossing occurred, the operation of the motor is maintained; otherwise, commutation in the motor is performed by shifting a phase angle required to start the motor; and detecting a zero-crossing signal of the back EMF according to the duty cycle, and switching a three-phase VFD sequentially, so that a current from one of the multiple-phase windings of the stator of the motor flows into a DC power supply Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following.

Figure 1:
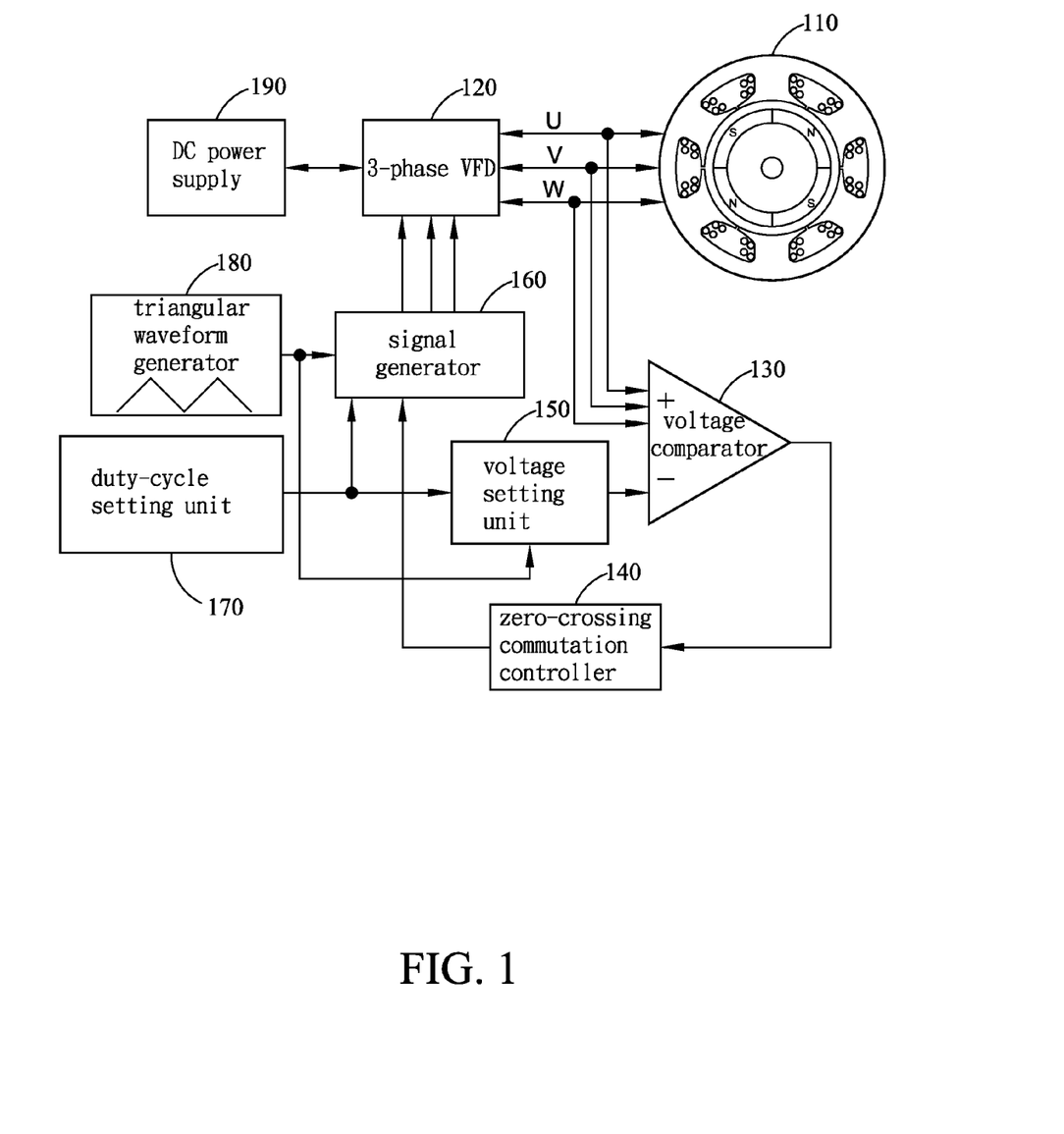
FIG. 1 is a block diagram of a control system for a sensorless motor with energy recovery ability according to an exemplary embodiment of the present disclosure.

Please refer to FIG. 1, which is a block diagram of a control system for a sensorless motor with energy recovery ability according to an exemplary embodiment of the present disclosure. The system includes a 3-phase motor 110, a 3-phase variable frequency drive (hereafter, VFD) 120, a voltage comparator 130, a zero-crossing commutation controller 140, a voltage setting unit 150, a signal generator 160, a duty-cycle setting unit 170, a triangular waveform generator 180, and a DC power supply 190. The 3-phase motor 110 can be a 4-pole permanent-magnet synchronous motor in the embodiment. The DC power supply 190 is connected to the permanent-magnet synchronous motor 110 through the 3-phase VFD 120, which can be used to control an input voltage of the permanent-magnet synchronous motor 110 so that a sufficient current can provide the motor with a sufficient torque. The DC power supply 190, such as a battery or another type of DC power, has a DC voltage of $V_{dc}$ and is used to store electrical energy recovered by the motor 110. The 3-phase VFD 120 can be modulated by a pulse-width-modulation (PWM) signal which is produced by comparing a triangular wave to the output signal of the duty-cycle setting unit 170. The triangular wave is provided by the triangular waveform generator 180 as a time counter for the PWM. The duty-cycle setting unit 170 is used to set a duty cycle of its output signal. The output voltage of the voltage setting unit 150 is 0 or $V_{dc}/2$ according to the duty cycle set by the duty-cycle setting unit 170. The voltage comparator 130 is used to compare the terminal voltage of the 3-phase motor 110 in the non-excited phase with the output voltage of the voltage setting unit 150, to determine the zero-crossing of the back EMF (Electromotive force) signals. The phase angle can be shifted in order to start the 3-phase motor 110 according to the back EMF zero-crossing of the zero-crossing commutation controller 140. After that, the 3-phase motor 110 operates to periodically reverse the current direction in the moving coil of its armature. The signal generator 160 is coupled to the zero-crossing commutation controller 140, the duty-cycle setting unit 170, and the triangular waveform generator 180 to respectively receive the commutation signal, the duty cycle, and the triangular wave, to produce a trigger signal for the 3-phase VFD 120. The 3-phase VFD 120 receives the trigger signal to modulate the energy recovery from the 3-phase motor 110 to the DC power supply 190.

Figure 2:
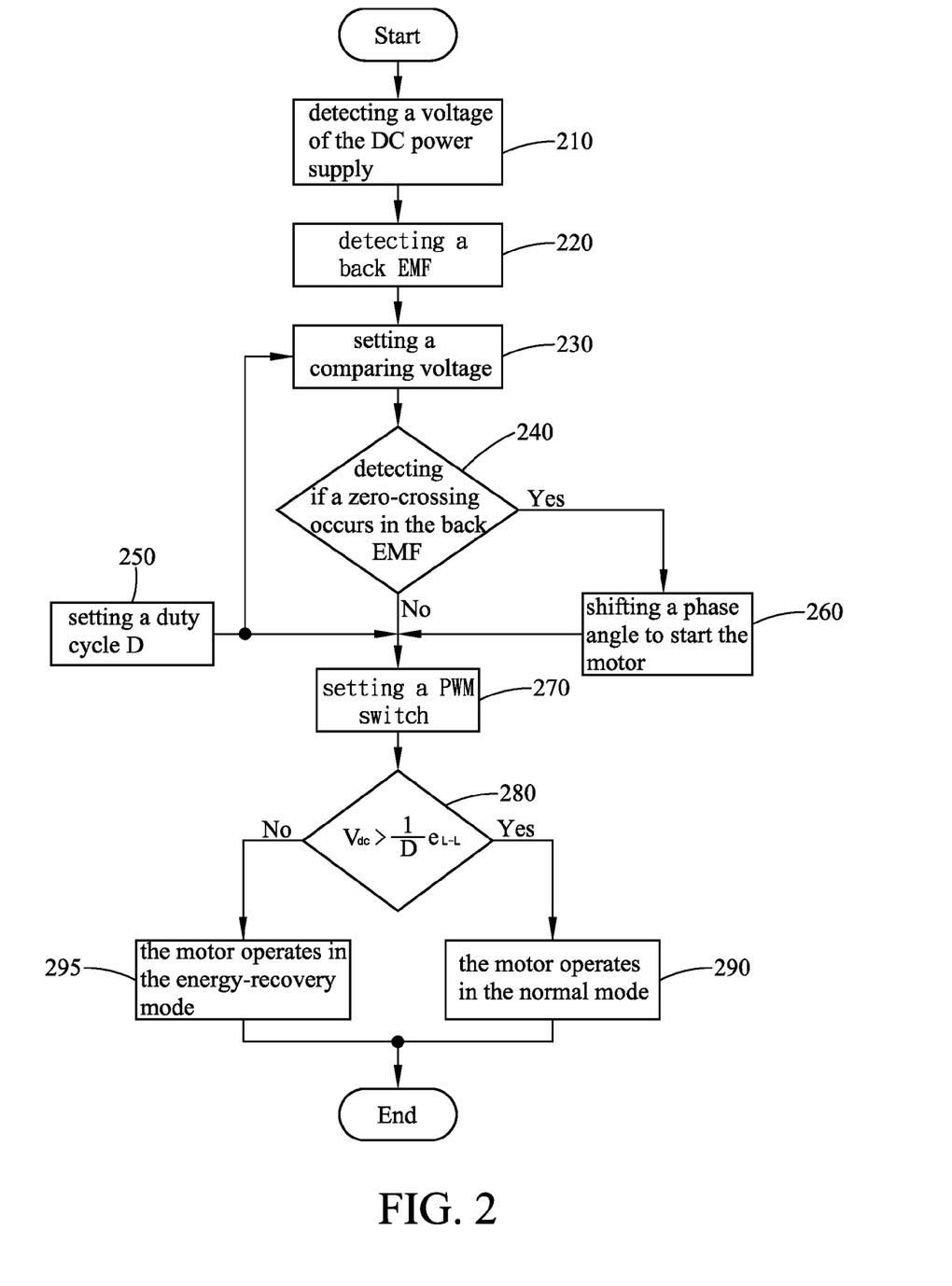
FIG. 2 is a flow chart of a control method for a sensorless motor with energy recovery ability according to another embodiment of the present disclosure.

Please refer to FIG. 2, which is a flow chart of a control method for a sensorless motor with energy recovery ability according to another embodiment of the present disclosure. The method includes the following steps: Step (210) detecting a voltage of the DC power supply; Step (220) detecting a back EMF; Step (230) setting a comparing voltage; Step (240) detecting if a zero-crossing occurs in the back EMF; if a zero-crossing is detected, then Step (260) shifting a phase angle to start the motor and Step (270) setting a PWM switch; if a zero-crossing is not detected, then only Step (270) setting a PWM switch; Step (250) providing a duty cycle D as a reference in Steps (230) and (240); Step (280) determining if $$V_{dc} > \frac{1}{D} e_{L-L}$$

is satisfied; if $V_{dc}$ is larger than $$\frac{1}{D} e_{L-L},$$

then the motor operates in the normal mode (Step 290); if $V_{dc}$ is not larger than $$\frac{1}{D} e_{L-L},$$

then the motor operates in the energy-recovery (Step 295), wherein $e_{L-L}$ denotes the line-to-line back EMF and D denotes the duty cycle.

The process in FIG. 2 starts with the time counter of the triangular waveform generator 180 in FIG. 1 reset to zero. At first, the voltage $V_{dc}$ of the DC power supply 190 is measured. The voltage $V_{dc}$ can serve as a DC voltage value for the voltage setting unit 150 in FIG. 1. Then the terminal voltage of the motor 110 in the non-excited phase is measured to be the back EMF of the motor 110. The duty-cycle setting unit 170 is used to set a duty cycle of its output signal. Considering the output signal of small duty cycle, the lower-arm switch in the control phase of chopped wave which is used to control turning-on or off between two phases can be turned on for a longer time in the 3-phase VFD 120, and the output voltage of the voltage setting unit 150 is set to be 0 as the comparing voltage. On the contrary, for the output signal with a large duty cycle, the output voltage of the voltage setting unit 150 is set to be $V_{dc}/2$ as the comparing voltage. The back EMF is then compared to the comparing voltage. If there is no zero-crossing occurred, the operation of the motor 110 is maintained. Once a zero-crossing occurs, commutation in the motor 110 will be performed by shifting a phase angle required to start the motor 110. Finally, according to the commutation signal and the duty cycle, the 3-phase VFD 120 is triggered as in the normal operating mode or in the energy-recovery mode. Based on the value of $V_{dc}$, the duty cycle, and the back EMF of the motor 110, if $$V_{dc} > \frac{1}{D} e_{L-L}$$

then the motor operates in the normal mode; but if $$V_{dc} < \frac{1}{D} e_{L-L}$$

then the motor operates in the energy-recovery mode. It should be noticed that the operation modes of the motor are switched automatically, without additional controlling efforts.

Figure 3:
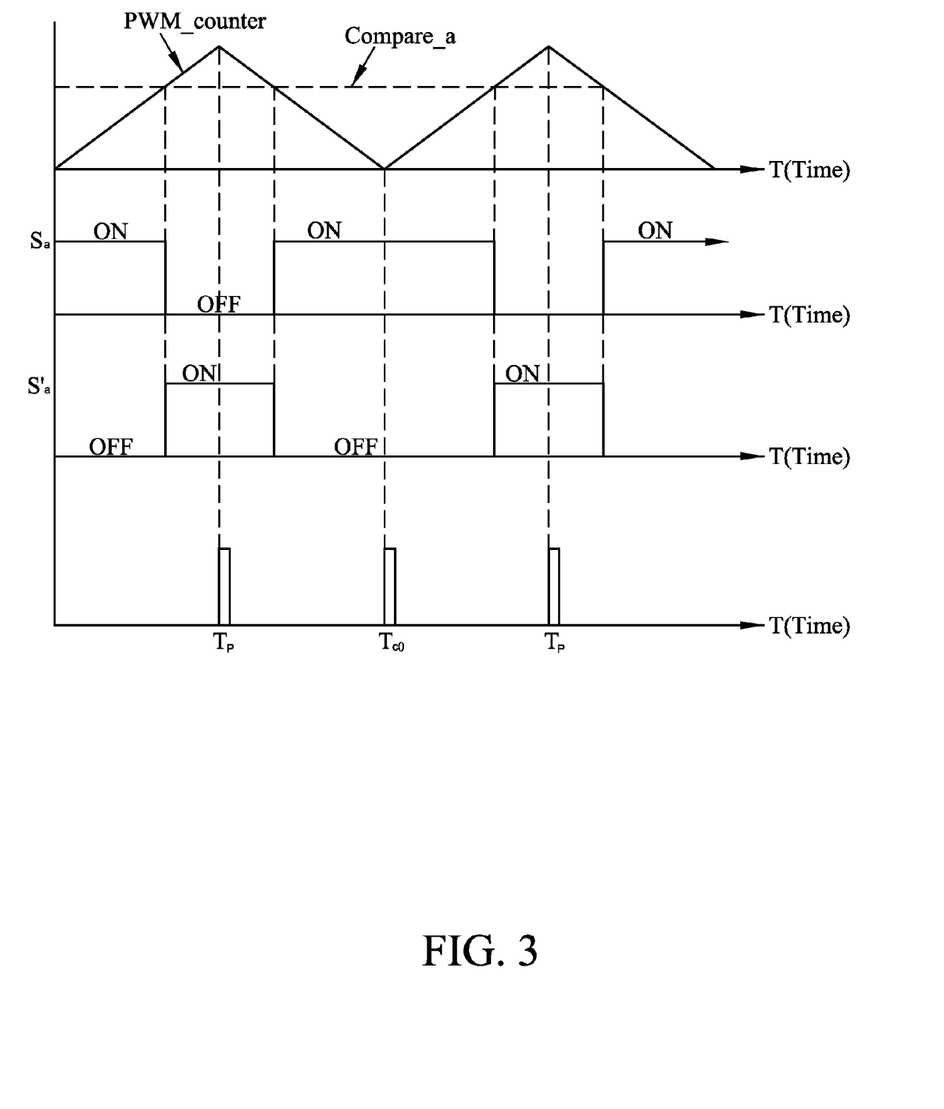
FIG. 3 is the switching of the complementary switches and the sampling of the back EMF.

Refer to FIG. 3, which schematically shows the switching of the complementary switches and the sampling of the back EMF. For example, phases a and b are the excited phases of the motor, but phase c is its non-excited phase. The output signals of the PWM counter and the duty-cycle setting unit 170, respectively denoted by PWM_counter and Compare_a as shown in FIG. 3, produce switching signals for the upper-arm Sa and lower-arm S'a switches. The switching durations of the switching signals Sa and S'a are different from each other. Compare_a in FIG. 3 may be adjusted by the duty-cycle setting unit 170. The more the duty cycle is set, the higher the horizontal line Compare_a is raised; hence the ON time of the upper-arm Sa will be more than that of the lower-arm S' a. On the contrary, the less the duty cycle is set, the lower the horizontal line Compare_a is moved; hence the ON time of the upper-arm Sa will be less than that of the lower-arm S'a. Located at the peak of the PWM triangular wave, the sampling pulse Tp is applicable to a low-speed or light-loading motor. Located at the zero of the PWM triangular wave, the sampling pulse $Tc_0$ is applicable to a high-speed or heavy-loading motor. Adoption of either Tp or $Tc_0$ is based on the duty cycle, so as to perform the measurement of the terminal voltage of the non-excited phase c. The back EMF of phase c is obtained to detect zero crossings, so as to delay a phase angle as a commutation point required for starting the motor. Similarly, the foregoing description can be applicable to the other operation modes, which have two excited phases and one non-excited phase.

Figure 4:
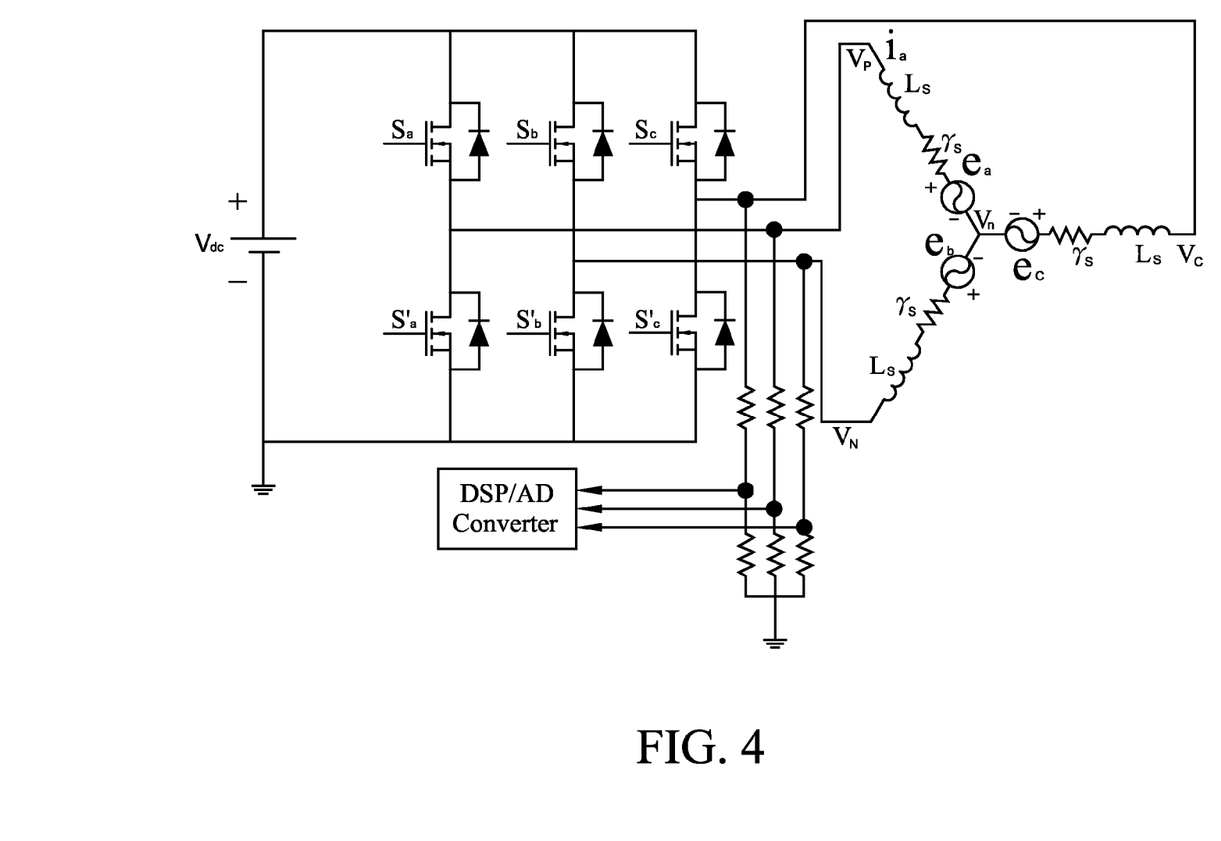
FIG. 4 is a circuit diagram of the 3-phase VFD 120 according to the embodiment.

Refer to FIG. 4, which schematically shows a circuit diagram of the 3-phase VFD 120 according to the embodiment. The 3-phase VFD 120 can be operated in six modes. Here one of the modes is taken as an example, where phases a and b are the excited phases of the motor, but phase c is its non-excited phase. The upper-arm switch Sa of phase a and the lower-arm switch S'b of phase b are turned on while the switches Sc and S'c of phase c are non-excited. The phase a performs the PWM function, but the lower-arm switch S'b of phase b is turned on just for the phase commutation. When the back EMF is measured, the terminal voltage between the non-excited switches Sc and S'c of phase c and the DC ground is detected directly. The terminal voltage is then shrunk by a voltage divider so as to meet the voltage applicable to the digital signal processing (DSP) operation of the DSP/AD converter. For another operation mode, phases b and c are the excited phases of the motor, but phase a is its non-excited phase. The upper-arm switch Sb of phase b and the lower-arm switch S'c of phase c are turned on while the switches Sa and S'a of phase a are non-excited. The phase b performs the PWM function, the lower-arm switch S'c of phase c is turned on just for the phase commutation and the terminal voltage between the switches Sa and S'a of phase a and the DC ground is detected. Operations of the other four modes can refer to the foregoing embodiments and are not re-described here.

Figure 5:
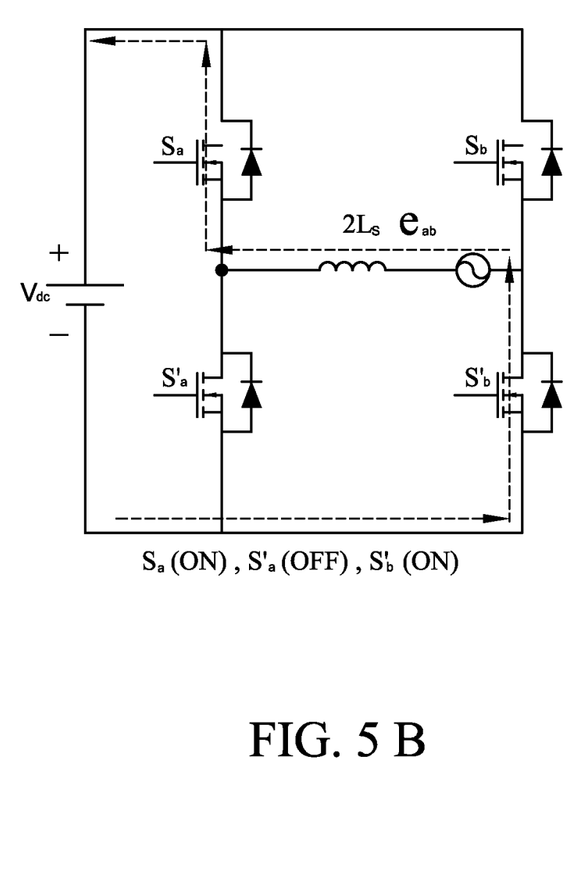
FIGS. 5A and 5B are the energy-recovery circuit diagrams.

Refer to FIGS. 5A and 5B, which schematically show the energy-recovery circuit diagrams. When the DC battery voltage $V_{dc}$ and the duty cycle of the complementary switches satisfy the relation of $$V_{dc} < \frac{1}{D} e_{L-L},$$

the motor is switched to the energy-recovery mode. The 3-phase VFD 120 can be operated in six modes. Here one of the modes is taken as an example, where phases a and b are the excited phases of the motor, but phase c is its non-excited phase. In FIG. 5A, switches S'a and S'b are turned on while the other switches are turned off, so that the energy can be stored in the inductance 2Ls. In FIG. 5B, however, switches Sa and S'b are turned on while the other switches are turned off, so that the energy can be recharged back to the DC battery $V_{dc}$. For another operational mode (not shown), phases b and c are the excited phases of the motor, but phase a is its non-excited phase. Switches S'b and S'c are turned on while the other switches are turned off, so that the energy can be stored in the inductance 2Ls. However, when switches Sb and S'c are turned on and the other switches are turned off, the energy can be recharged to the DC battery $V_{dc}$. Operations of the other four modes can refer to the foregoing embodiments and are not re-described here again.

Figure 6:
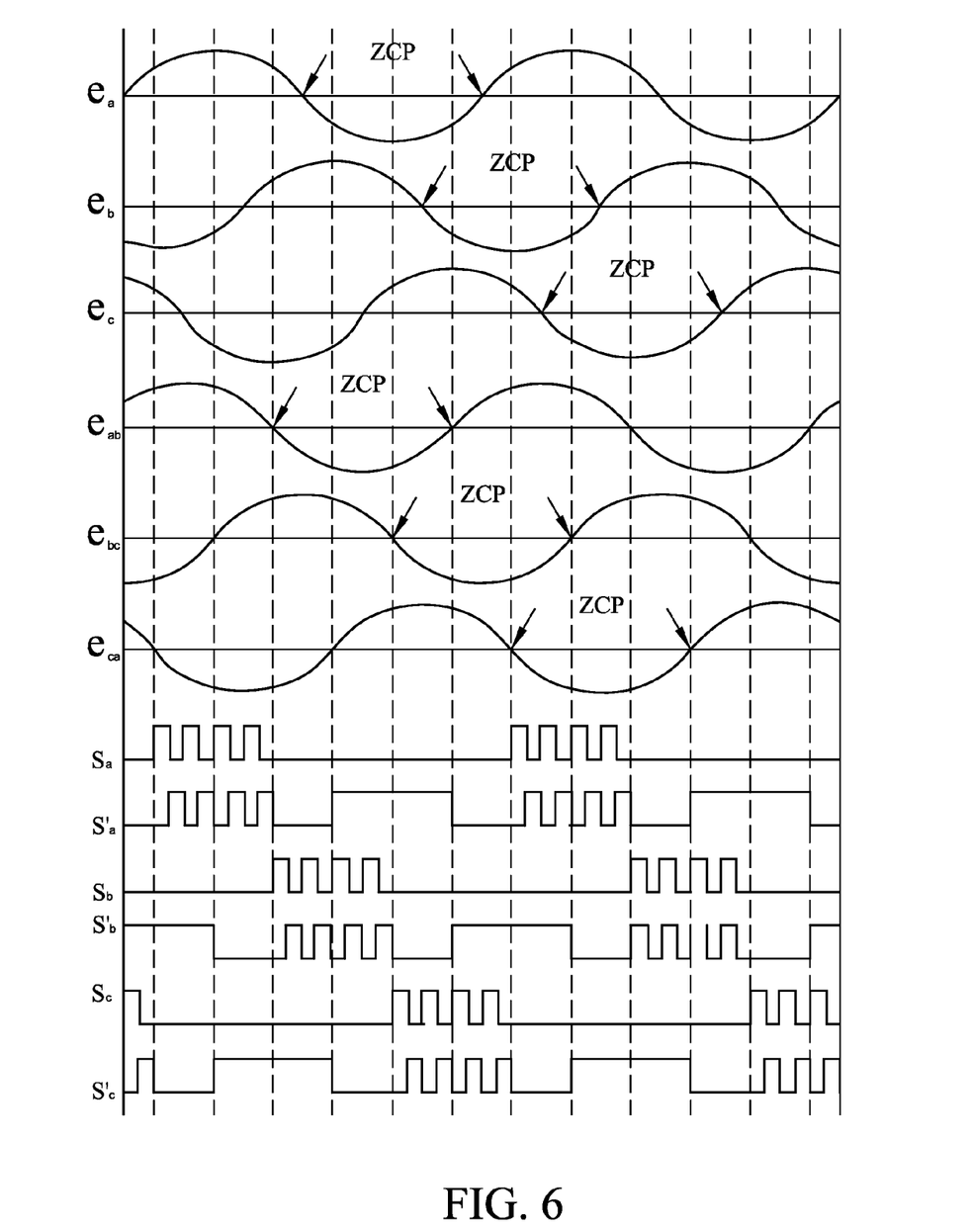
FIG. 6 is the phase back EMF and the line-to-line back EMF corresponding to the switching of the complementary switches.

Refer to FIG. 6, which schematically shows the phase back EMF and the line-to-line back EMF corresponding to the switching of the complementary switches. The operations of the motor can be switched either to the normal motor mode or to the energy-recovery mode automatically, according to the duty cycle and the back EMF. It can also be observed that the commutation begins at the time either when a zero-crossing point (ZCP) of the line-to-line back EMF occurs, or when a phase angle required to start the motor has been shifted after the occurrence of a zero-crossing point of the phase back EMF.

Figure 7:
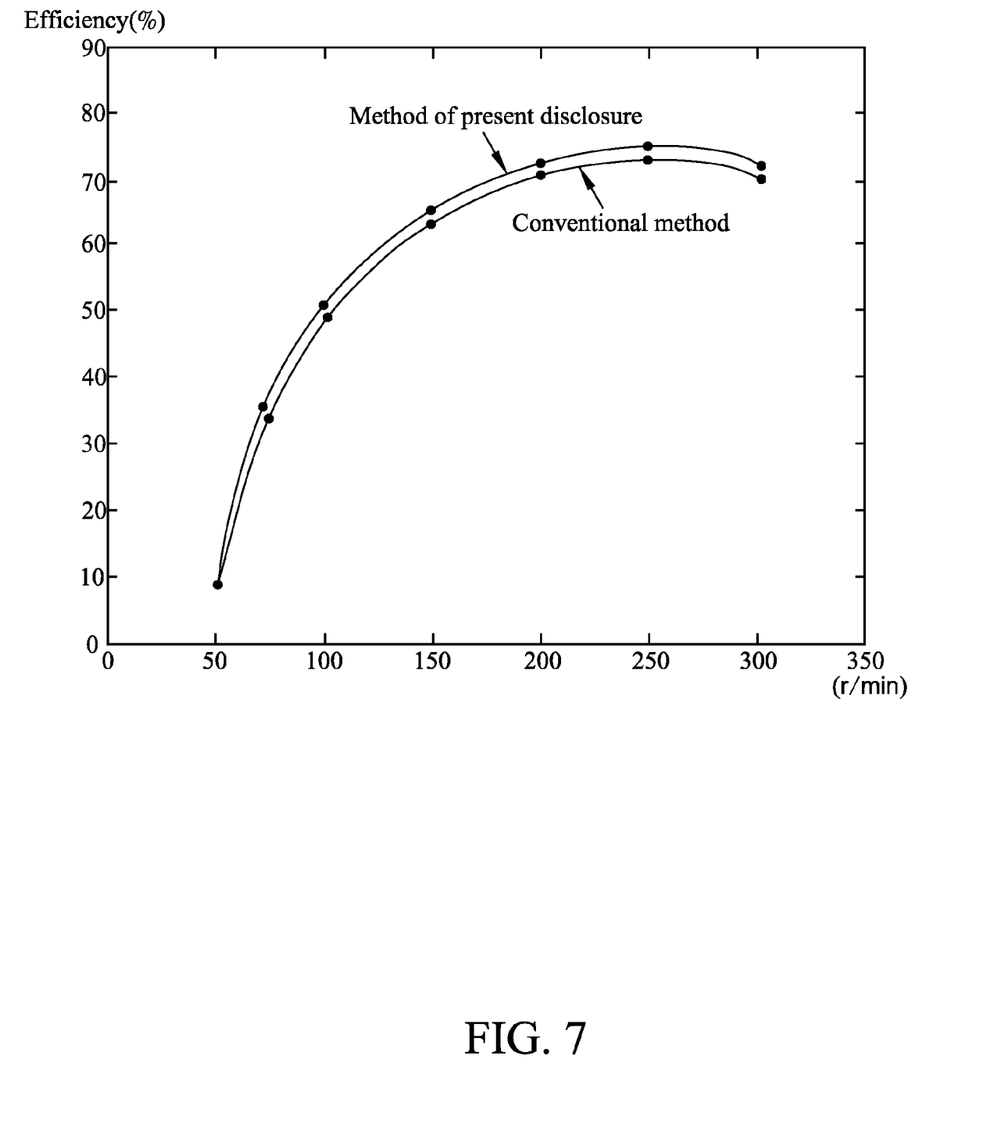
FIG. 7 is the dependency of the energy-recovery efficiency of the embodiment according to the present disclosure and the conventional flywheel-diode method on the rotation speed of the motor.

Refer to FIG. 7, which shows the dependency of the energy-recovery efficiency of the embodiment according to the present disclosure and the conventional flywheel-diode method on the rotation speed of the motor. As shown in FIG. 7, the energy-recovery efficiency of the present embodiment is higher than that of the conventional method in the rotation speed from 50 rpm to 300 rpm. Moreover, the higher the rotation speed is, the higher the energy-recovery efficiency is. The measured energy-recovery efficiencies can be summarized in the Table 1.

TABLE 1

| | efficiency | | |
|---|---|---|---|
| rotation speed | Present disclosure (%) | Conventional method (%) | Difference (%) |
| 302 rpm | 72.1 | 70.3 | 1.8 |
| 250 rpm | 75 | 72.3 | 2.7 |
| 200 rpm | 71.6 | 69.9 | 1.7 |
| 150 rpm | 65.2 | 63.5 | 1.7 |
| 100 rpm | 50.7 | 49.5 | 1.2 |
| 75 rpm | 34.5 | 33.7 | 0.8 |
| 50 rpm | 8.56 | 8.2 | 0.36 |

From the foregoing description, it can be understood that the present disclosure relates to a method and an apparatus for controlling a sensorless motor of energy recovery ability. The motor can be mounted on a traffic vehicle and its operation can be switched between the normal operating mode and the energy-recovery mode automatically. The disclosure can be applied to a variety of industry fields, such as electric bicycle, electric motorcycle, electric automobile, or other electric automation, so as to increase the added value of traffic vehicles. Moreover, development of the prior-art sensorless motor have mainly focused on detecting the rotor position and starting the motor, while the function of energy recovery is seldom investigated. Though the regenerative braking method can be used to recycle energy, the flywheel diodes in the regenerative braking controller may cause the switching loss and the heating issue in the diodes. The power dissipation in the flywheel diodes may be inevitable either in the motor operating mode or in the energy-recovery mode. In the present disclosure, it is presented that a control method of automatically switching between the motor operating mode and the energy-recovery mode may overcome the drawbacks in the prior art. The current flow paths are built by the turning-on switches instead of by the flywheel diodes, so that the power dissipation can be lowered and the energy-recovery efficiency can be improved remarkably.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for controlling a sensorless motor with energy recovery ability, the method comprising the steps of:
    (a) selecting a comparing voltage from a first or a second voltage by setting a duty cycle of a duty-cycle setting unit;
    (b) comparing a terminal voltage of the motor in the non-excited phase with the comparing voltage, so as to determine the occurrence of a zero-crossing of the back EMF in the motor;
    (c) shifting a phase angle required to start the motor after the occurrence of the zero-crossing, so as to perform phase commutation in the motor;
    (d) transmitting a trigger signal to set the operation of the motor in a normal operating mode or in an energy-recovery mode, according to the commutation period, a triangular wave provided by a triangular waveform generator, and the duty cycle of the duty-cycle setting unit;
    (e) producing the comparing voltage and detecting the terminal voltage of the motor in the non-excited phase, so as to measure the back EMF in the motor, at the time either when a time counter of the triangular waveform generator is reset to zero or when the counting period ends;
    (f) setting the first voltage as the comparing voltage if the turn-on duration of a lower-arm switch in the control phase of chopped wave which is used to control turning-on or off between two phases is larger than the duty cycle; otherwise, setting the second voltage as the comparing voltage;
    (g) comparing the back EMF to the comparing voltage, if no zero-crossing occurred, the operation of the motor is maintained; otherwise, commutation in the motor is performed by shifting a phase angle required to start the motor; and
    (h) detecting a zero-crossing signal of the back EMF according to the duty cycle, and switching a three-phase VFD sequentially, so that a current from one of the multiple-phase windings of the stator of the motor flows into a DC power supply.

2. The method of claim 1, wherein the step (g) further comprises an automatically switching between the normal operating mode and the energy-recovery mode for the motor; if $$V_{dc} > \frac{1}{D} e_{L-L},$$

the motor operates in the normal operating mode; but if $$V_{dc} < \frac{1}{D} e_{L-L},$$

the motor operates in the energy-recovery mode, wherein $V_{dc}$ denotes the DC voltage of the DC power supply, D denotes the duty cycle, and $e_{L-L}$ denotes the line-to-line back EMF.

3. The method of claim 1, wherein the operating mode of the motor is set to be the normal mode or the energy-recovery mode according to the duty cycle.

4. The method of claim 1, wherein step (c) further comprises: measuring the terminal voltage of the motor in the non-excited phase to acquire its non-excited phase back EMF and to determine the occurrence of a zero-crossing so as to delay a phase angle as a commutation point required for starting the motor, according to the switching durations of the upper-arm and lower-arm switches in the three-phase VFD.

5. The method of claim 1, wherein the first voltage is 0 and the second voltage is $V_{dc}/2$, where $V_{dc}$ denotes the DC voltage of the DC power supply.

* * * * *